June 12, 1928.  W. AMES  1,673,480
GAUGE
Filed May 5, 1927
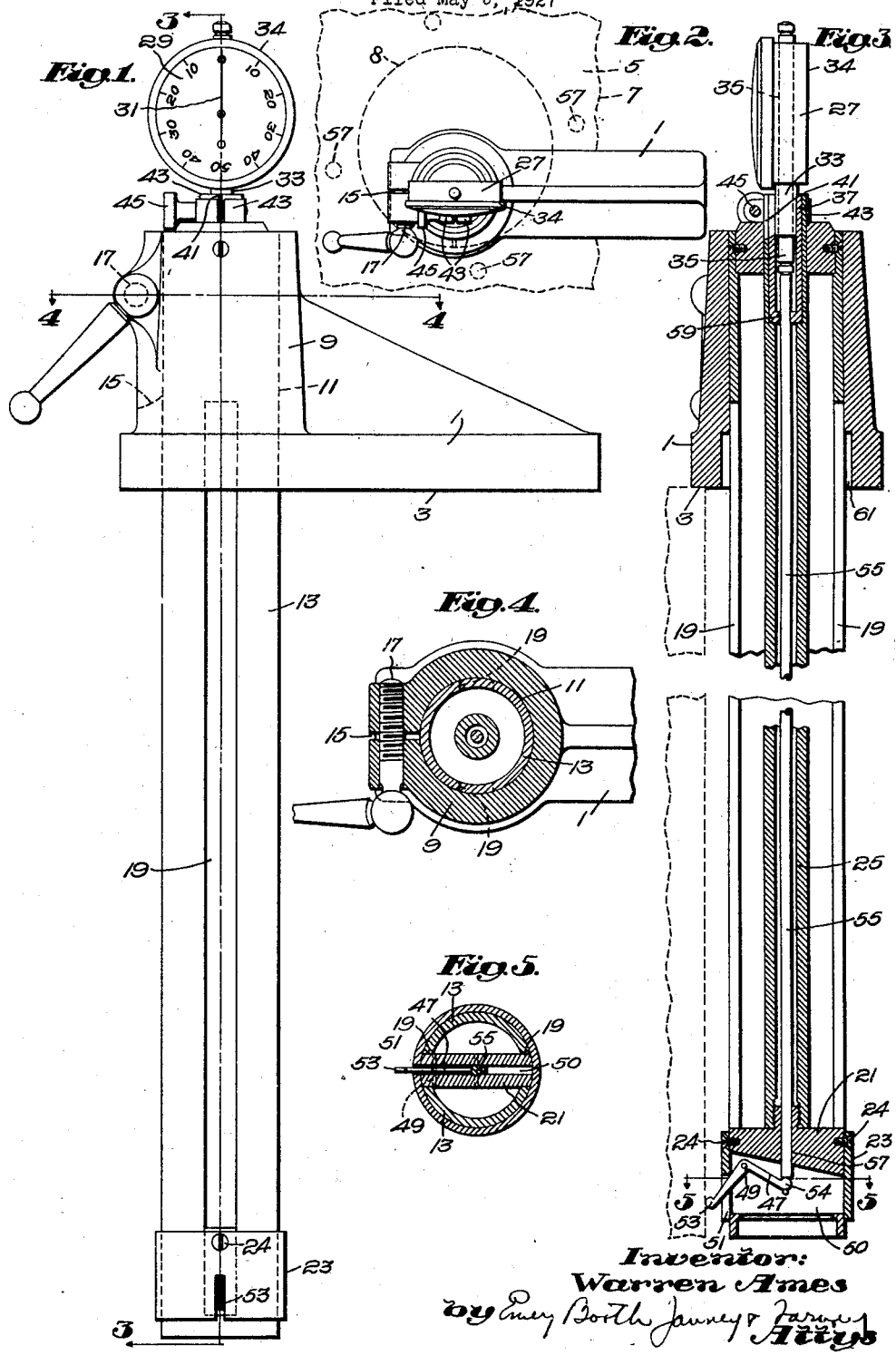
Inventor:
Warren Ames Patented June 12, 1928.

1,673,480

UNITED STATES PATENT OFFICE.

WARREN AMES, OF WALTHAM, MASSACHUSETTS, ASSIGNOR TO B. C. AMES CO., OF WALTHAM, MASSACHUSETTS, A CORPORATION OF MASSACHUSETTS.

GAUGE.

Application filed May 5, 1927. Serial No. 189,133.

My invention relates to gauges, and particularly but not exclusively to one for testing and measuring the relation of the walls of a cylinder bore to a given plane, as for example the end face of the cylinder.

The invention will be best understood from the following description when read in the light of the accompanying drawing of a specific embodiment of the invention selected for illustrative purposes, while the scope of the invention will be more particularly pointed out in the appended claims.

In the drawing:—

Fig. 1 is an elevation of a gauge constructed according to the invention;

Fig. 2 is a plan of the gauge constructed according to Fig. 1, this figure also indicating the application of the gauge to a cylinder which is to be measured or tested;

Figs. 3 and 4 respectively are sections on the lines 3—3 and 4—4 of Fig. 1, Fig. 3 showing the application of the gauge to a cylinder; and Fig. 5 is a section on the line 5—5 of Fig. 3.

Referring to the drawing I have shown a base member 1 which herein is provided with a plane bottom face 3 adapted to rest on the end face 5 of a cylinder block 7, the bore of which block is shown at 8. As shown the base member has formed integrally therewith an upwardly extending sleeve 9 provided with a bore 11 which receives a transversely extending bar 13 the axis of which is normal to the plane of the face 3. Herein the bar 13 is tubular and the outer surface thereof is a cylinder, the bar being slidably and rotatably mounted in the bore 11 so that the bar may be adjusted both lengthwise thereof and rotatably relative to the base member. Suitable means may be provided for securing the base member and bar in their adjusted positions, which means herein is exemplified by a clamp formed by providing the sleeve 9 with a longitudinal split 15 and a cooperating clamping screw 17.

As shown the tubular member 13 is provided with oppositely disposed, longitudinal slots 19 in which are slidably mounted the respective opposite end portions of a block 21 held against transverse displacement relative to the bar 13 by a sleeve 23 slidably fitting the exterior of the bar and connected to the block by screws 24. Herein secured to the block 21 is a tubular rod 25 which at its upper end carries an indicating device 27 having the vertically disposed, graduated dial 29 and pointer 31. This indicating device preferably is of a known form having a sleeve 33 fixed to the casing 34 of the device, through which sleeve and casing extends a reciprocatory rod 35 yieldingly urged outward from the sleeve and casing and actuating the mechanism of the device so that the pointer will indicate the degree of extension of the rod from the sleeve, the dial for this purpose conveniently being calibrated into thousandths of an inch and being rotatably adjustable relative to the casing for setting its zero mark under the pointer. As shown the sleeve 33 of the indicating device is removably inserted in the bore of a tubular bushing 37 carried at the upper end of the rod 25, the bushing and rod being split at their upper ends as indicated at 41 to render the end portions thereof resilient and adapting them to be clamped against the sleeve 33 by use of a split clamping band 43 having the operating screw 45. It will be observed by this construction that the casing of the indicating device is removably attached to the rod 35, and may be turned in different positions relative to the bar.

As shown the block 21, which slidingly fits the sides of the groove 19 of the tubular bar 13 so as to prevent rotation of the block relative to the tubular member, carries a bell crank lever 47 pivoted to the block at 49, the block and sleeve 23 being slotted as indicated respectively at 50 and 51 for receiving this lever. One leg 53 of the bell crank lever projects through the slot and sleeve and constitutes a contact feeler adapted to contact with the wall of the cylinder bore, while the opposite leg 54 contacts with a rod 55 slidably mounted at 57 and 59 respectively in the block 21 and bushing 37, the upper end of the rod 55 contacting with the actuating rod 35 of the indicating device so that movement of the bell crank lever will actuate the pointer of the indicating device. Conveniently the bore 11 of the base member may be counterbored adjacent its lower end to provide a recess 61 for receiving the ring 23 when at the upper limit of its travel relative to the bar 13, which construction permits the contact feeler to operate upon that portion of the wall of the cylinder bore which is adjacent the end face of the cylinder.

As an example of one use of the gauge herein described, the base member 1 may be positioned with its face 3 resting upon the end face 5 of the cylinder, in which case the tubular member 13 will project into the bore of the cylinder with its axial line normal to said end face. The casing of the indicating device 27 may then be grasped and manually reciprocated relative to the cylinder, which will cause the block 21 to reciprocate on the bar 13, thus causing the contact feeler to traverse a line of contact on the cylinder bore in a plane normal to the end face of the cylinder. If this line of contact is exactly normal to said end face there will be no deflection of the pointer 31, whereas if the line of contact is not normal to the end face the existence of such condition will be indicated by a deflection of the pointer, the magnitude of the departure of the line of contact from a line normal to the end face being measured by the amount of deflection of the pointer as shown by the graduations on the dial.

Conveniently the bar 13 is so located relative to the base member that the base member may contact with the bore of the cylinder at opposite sides thereof as indicated by Fig. 2. The provision for rotating the tubular member relative to the bar and clamping it in different positions allows particular portions of the circumference of the bore to be measured or tested without the base member interfering with any projections that may be present on the end face, such as stud-bolts 57 indicated in Fig. 2. The provision for adjusting the bar lengthwise relative to the base member permits variation in the maximum amount of reciprocation of the contact feeler so as readily to adapt the gauge to cylinder bores of different lengths.

It will be understood that I am not limited to the particular embodiment of the invention herein described, but that within the scope of the invention wide deviations may be made from this embodiment without departing from the spirit of the invention.

Claims—

1. A gauge for a cylinder with an end face having, in combination, means providing a contact feeler which is adapted to be inserted in the bore of said cylinder and yieldingly held in contact with the wall of said bore; means including a feeler-guiding-part adapted to be supported in said bore in stationary relation to said cylinder for supporting said feeler for reciprocation in said bore longitudinally thereof in a plane substantially normal to said end face, whereby said feeler will traverse a line of contact on said wall in a plane substantially normal to said end face; an indicating device, and means for actuating said indicating device by movement of said feeler transverse to its reciprocatory movement, whereby said indicating device will show the departure of said line of contact from a base line substantially normal to said end face.

2. A gauge for a cylinder with an end face having, in combination, means providing a contact feeler which is adapted to be inserted in the bore of said cylinder and yieldingly held in contact with the wall of said bore; means including a feeler-guiding-part adapted to be supported in said bore in stationary relation to said cylinder for supporting said feeler for reciprocation in said bore longitudinally thereof in a plane substantially normal to said end face, whereby said feeler will traverse a line of contact on said wall in a plane substantially normal to said end face; an indicating device means for actuating said indicating device by movement of said feeler transverse to its reciprocatory movement, whereby said indicating device will show the departure of said line of contact from a base line substantially normal to said end face; and means supporting said indicating device exteriorly of said bore while said contact feeler is in said bore and reciprocated.

3. A gauge for a cylinder with an end face having, in combination, means providing a contact feeler which is adapted to be inserted in the bore of said cylinder and yieldingly held in contact with the wall of said bore; a feeler-guiding-part adapted to be inserted in the bore of said cylinder, means adapted to rest on said end face for supporting said feeler-guiding-part, the latter supporting said feeler for reciprocation longitudinally thereof in a plane substantially normal to said end face, whereby said feeler will traverse a line of contact on said wall in a plane substantially normal to said end face; an indicating device, and means for actuating said indicating device by movement of said feeler transverse to its reciprocatory movement, whereby said indicating device will show the departure of said line of contact from a base line substantially normal to said end face.

4. A gauge for a cylinder with an end face having, in combination, means providing a contact feeler which is adapted to be inserted in the bore of said cylinder and yieldingly held in contact with the wall of said bore; a feeler-guiding-part adapted to be inserted in the bore of said cylinder, means adapted to rest on said end face and contact therewith at opposite sides of said bore for supporting said feeler-guiding-part, the latter supporting said feeler for reciprocation longitudinally thereof in a plane substantially normal to said end face, whereby said feeler will traverse a line of contact on said wall in a plane substantially normal to said end face; an indicating device, and means for actuating said indicating device by movement of said feeler transverse to its reciprocatory movement, whereby said indicating device will show the departure of said line of contact from a base line substantially normal to said end face.

5. A gauge for a cylinder with an end face having, in combination, means providing a contact feeler which is adapted to be inserted in the bore of said cylinder and yieldingly held in contact with the wall of said bore; a feeler-guiding-part adapted to be inserted in the bore of said cylinder, means adapted to rest on said end face for supporting said feeler-guiding-part, the latter supporting said feeler for reciprocation longitudinally thereof in a plane substantially normal to said end face, whereby said feeler will traverse a line of contact on said wall in a plane substantially normal to said end face; an indicating device, means for actuating said indicating device by movement of said feeler transverse to its reciprocatory movement, whereby said indicating device will show the departure of said line of contact from a base line substantially normal to said end face; and means supporting said indicating device exteriorly of said bore while said contact feeler is in said bore and reciprocated.

6. A gauge for a cylinder with an end face having, in combination, means providing a contact feeler which is adapted to be inserted in the bore of said cylinder and yieldingly held in contact with the wall of said bore; a feeler-guiding-part adapted to be inserted in the bore of said cylinder, means supporting said feeler-guiding-part, the latter supporting said feeler for reciprocation longitudinally thereof in a plane substantially normal to said end face, whereby said feeler will traverse a line of contact on said wall in a plane substantially normal to said end face; means for varying the limits of maximum reciprocation of said feeler, an indicating device and means for actuating said indicating device by movement of said feeler transverse to its reciprocatory movement, whereby said indicating device will show the departure of said line of contact from a base line substantially normal to said end face.

7. A gauge for a cylinder with an end face having, in combination, means providing a contact feeler which is adapted to be inserted in the bore of said cylinder and yieldingly held in contact with the wall of said bore; a feeler-guiding-part adapted to be inserted in the bore of said cylinder, means supporting said feeler-guiding-part, the latter supporting said feeler for reciprocation longitudinally thereof in a plane substantially normal to said end face, whereby said feeler will traverse a line of contact on said wall in a plane substantially normal to said end face; an indicating device, and means for actuating said indicating device by movement of said feeler transverse to its reciprocatory movement, whereby said indicating device will show the departure of said line of contact from a base line substantially normal to said end face; said indicating device having a dial disposed in a vertical plane and being supported exteriorly of said bore for rotative movement about a vertical axis.

8. A gauge for a cylinder with an end face having, in combination, means providing a contact feeler which is adapted to be inserted in the bore of said cylinder and yieldingly held in contact with the wall of said bore; a feeler-guiding-part adapted to be inserted in the bore of said cylinder, means adapted to rest on said end face for supporting said feeler-guiding-part, the latter supporting said feeler for reciprocation longitudinally thereof in a plane substantially normal to said end face, whereby said feeler will traverse a line of contact on said wall in a plane substantially normal to said end face; an indicating device, and means for actuating said indicating device by movement of said feeler transverse to its reciprocatory movement, whereby said indicating device will show the departure of said line of contact from a base line substantially normal to said end face; said feeler being adjustable angularly relative to said means which rests on said end face.

9. A gauge for a cylinder with an end face having, in combination, means providing a contact feeler which is adapted to be inserted in the bore of said cylinder and yieldingly held in contact with the wall of said bore; a feeler-guiding-part adapted to be inserted in the bore of said cylinder, means adapted to rest on said end face for supporting said feeler-guiding-part, the latter supporting said feeler for reciprocation longitudinally thereof in a plane substantially normal to said end face, whereby said feeler will traverse a line of contact on said wall in a plane substantially normal to said end face; an indicating device, means for actuating said indicating device by movement of said feeler transverse to its reciprocatory movement, whereby said indicating device will show the departure of said line of contact from a base line substantially normal to said end face; said feeler being adjustable angularly relative to said means which rests on said end face; and means for varying the lower limit of reciprocation of said feeler relative to said means which rests on said end face.

10. A gauge for a cylinder with an end face having, in combination, a base member carrying a transversely disposed bar, said base member adapted to rest on said end face and support said bar with the latter inserted in the bore of said cylinder, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device by movement of said feeler transverse to said bar.

11. A gauge for a cylinder with an end face having, in combination, a base member carrying a transversely disposed bar, said base member adapted to rest on said end face and support said bar with the latter inserted in the bore of said cylinder, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device, and means for actuating said indicating device by movement of said feeler transverse to said bar, said indicating device being carried by said bar for reciprocation with said feeler.

12. A gauge for a cylinder with an end face having, in combination, a base member carrying a transversely disposed bar, said base member adapted to rest on said end face and support said bar with the latter inserted in the bore of said cylinder, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device by movement of said feeler transverse to said bar, said indicating device being carried by said bar at the side of said base member opposite said feeler.

13. A gauge for a cylinder with an end face having, in combination, a base member carrying a transversely disposed bar, said base member adapted to rest on said end face and support said bar with the latter inserted in the bore of said cylinder, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device by movement of said feeler transverse to said bar, said indicating device being carried by said bar at the side of said base member opposite said feeler for reciprocation with said feeler.

14. A gauge for a cylinder with an end face having, in combination, a base member carrying a transversely disposed bar, means for rigidly securing said bar to said member in adjusted positions lengthwise of said bar, said base member adapted to rest on said end face and support said bar with the latter inserted in the bore of said cylinder, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device by movement of said feeler transverse to said bar.

15. A gauge for a cylinder with an end face having, in combination, a base member carrying a transversely disposed bar, means for securing said bar to said member in adjusted positions lengthwise of said bar, said base member adapted to rest on said end face and support said bar with the latter inserted in the bore of said cylinder, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device by movement of said feeler transverse to said bar, said indicating device being carried by said bar at the side of said base member opposite said feeler for reciprocation with said feeler.

16. A gauge for a cylinder with an end face having, in combination, a base member rotatably carrying a transversely disposed bar, said base member adapted to rest on said end face and support said bar with the latter inserted in the bore of said cylinder, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device by movement of said feeler transverse to said bar.

17. A gauge for a cylinder with an end face having, in combination, a base member carrying a transversely disposed bar, means for securing said bar to said base member in different rotative positions of adjustment of said bar and in different positions lengthwise of said bar, said base member adapted to rest on said end face and support said bar with the latter inserted in the bore of said cylinder, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device by movement of said feeler transverse to said bar.

18. A gauge for a cylinder with an end face having, in combination, a base member carrying a transversely disposed bar, means for securing said bar to said base member in different rotative positions of adjustment of said bar and in different positions lengthwise of said bar, said base member adapted to rest on said end face and support said bar with the latter inserted in the bore of said cylinder, means providing a contact feeler supported on said bar for reciprocation in a plane normal to said end face when said base member is in operative position, said contact feeler being yieldingly urged outward from said bar for causing it when reciprocated to contact with the wall of said bore, an indicating device and means for actuating said indicating device by movement of said feeler transverse to said bar, said indicating device being carried by said bar at the side of said base member opposite said feeler for reciprocation with said feeler.

19. A gauge for a cylinder with an end face having, in combination, a base member carrying a transversely disposed bar, said base member adapted to rest on said end face at opposite sides of the bore of said cylinder and support said bar with the latter inserted in said bore, means providing a contact feeler supported on said bar for reciprocation longitudinally thereof in a plane normal to said end face when said base member is in operative position, said contact feeler being yieldingly urged outward from said bar for causing it when reciprocated to contact with the wall of said bore, an indicating device, and means for actuating said indicating device by movement of said feeler transverse to said bar.

20. A gauge for a cylinder with an end face having, in combination, a base member adapted to be supported on said end face, a tubular member carried by said base member, said tubular member adapted, when said base member is in operative position, to project into the bore of said cylinder with its axis substantially normal to said end face, an indicator having a contact feeler for engagement with the wall of said bore, and supporting means for said indicator and feeler mounted internally of said tubular member for reciprocation longitudinally thereof.

21. A gauge for a cylinder with an end face; a base member adapted to be supported on said end face; a tubular member carried by said base member, said tubular member adapted, when said base member is in operative position, to project into the bore of said cylinder with its axis substantially normal to said end face; a bar carried interiorly of said tubular member for reciprocatory movement, an indicator positioned exteriorly of said tubular member and carried by said bar at one end thereof; means including a contact feeler for engaging the wall of said bore for actuating said indicator, said means being supported by said bar and extending through a longitudinal slot in the wall of said tubular member.

22. A gauge for a cylinder with an end face; a base member adapted to be supported on said end face; a tubular member carried by said base member, said members being rotatably adjustable; said tubular member adapted, when said base member is in operative position, to project into the bore of said cylinder with its axis substantially normal to said end face; a bar carried interiorly of said tubular member for reciprocatory movement, an indicator positioned exteriorly of said tubular member and carried by said bar at one end thereof; means including a contact feeler for engaging the wall of said bore for actuating said indicator, said means being supported by said bar and extending through a longitudinal slot in the wall of said tubular member.

23. A gauge for a cylinder with an end face; a base member adapted to be supported on said end face; a tubular member carried by said base member, said tubular member adapted, when said base member is in operative position, to project into the bore of said cylinder with its axis substantially normal to said end face; a bar carried interiorly of said tubular member for reciprocatory movement, an indicator positioned exteriorly of said tubular member and carried by said bar at one end thereof; means including a contact feeler for engaging the wall of said bore for actuating said indicator, said means being supported by said bar and extending through a longitudinal slot in the wall of said tubular member; and means cooperating with the walls of said slot for preventing rotation of said contact feeler relative to said tubular member.

24. A gauge for a cylinder with an end face; a base member adapted to be supported on said end face at opposite sides of the bore of said cylinder; a tubular member carried by said base member, said tubular member adapted, when said base member is in operative position, to project into the bore of said cylinder with its axis substantially normal to said end face; a bar carried interiorly of said tubular member for reciprocatory movement, an indicator positioned exteriorly of said tubular member and carried by said bar at one end thereof; means including a contact feeler for engaging the wall of said bore for actuating said indicator, said means being supported by said bar and extending through a longitudinal slot in the wall of said tubular member.

In testimony whereof, I have signed my name to this specification.

WARREN AMES.